United States Patent
Hsien

(10) Patent No.: US 8,930,517 B2
(45) Date of Patent: Jan. 6, 2015

(54) SERVER RACK SYSTEM

(75) Inventor: Liu-Shen Hsien, Taipei (TW)

(73) Assignee: Inventec Corporation, Taipei (TW)

( * ) Notice: Subject to any disclaimer, the term of this patent is extended or adjusted under 35 U.S.C. 154(b) by 320 days.

(21) Appl. No.: 13/399,655

(22) Filed: Feb. 17, 2012

(65) Prior Publication Data

US 2013/0135821 A1 May 30, 2013

(30) Foreign Application Priority Data

Nov. 28, 2011 (CN) .......................... 2011 1 0384132

(51) Int. Cl.
*G06F 15/173* (2006.01)
(52) U.S. Cl.
USPC .......................................... 709/223; 709/224
(58) Field of Classification Search
None
See application file for complete search history.

(56) References Cited

U.S. PATENT DOCUMENTS

| | | | |
|---|---|---|---|
| 7,761,622 B2 * | 7/2010 | Nguyen | 710/62 |
| 8,166,539 B2 * | 4/2012 | Pan | 726/16 |
| 8,621,111 B2 * | 12/2013 | Marr et al. | 709/250 |
| 2008/0301275 A1 * | 12/2008 | Barry | 709/223 |
| 2012/0020349 A1 * | 1/2012 | Dunwoody et al. | 370/351 |
| 2012/0136489 A1 * | 5/2012 | Wang et al. | 700/282 |
| 2012/0136978 A1 * | 5/2012 | Lou et al. | 709/223 |
| 2012/0137148 A1 * | 5/2012 | He et al. | 713/310 |
| 2012/0331119 A1 * | 12/2012 | Bose et al. | 709/223 |
| 2013/0073882 A1 * | 3/2013 | Inbaraj et al. | 713/320 |

* cited by examiner

*Primary Examiner* — Hassan Kizou
*Assistant Examiner* — Phyllis Book
(74) *Attorney, Agent, or Firm* — CKC & Partners Co., Ltd.

(57) ABSTRACT

A server rack system is provided, which includes a rack, a rack management module, a plurality of servers, and a management network connection module. The rack management module is located in the rack and coupled to a management network line (MNL). The servers are located in the rack. Each server includes a baseboard management controller (BMC), and each BMC is used to monitor a working status of the server where the BMC is located. The management network connection module is located in the rack and coupled to the MNL to be connected to the rack management module and the BMC through the MNL. The rack management module is used to allocate an Internet Protocol (IP) address to the BMC and manage each server through the BMC corresponding to each IP address.

10 Claims, 1 Drawing Sheet

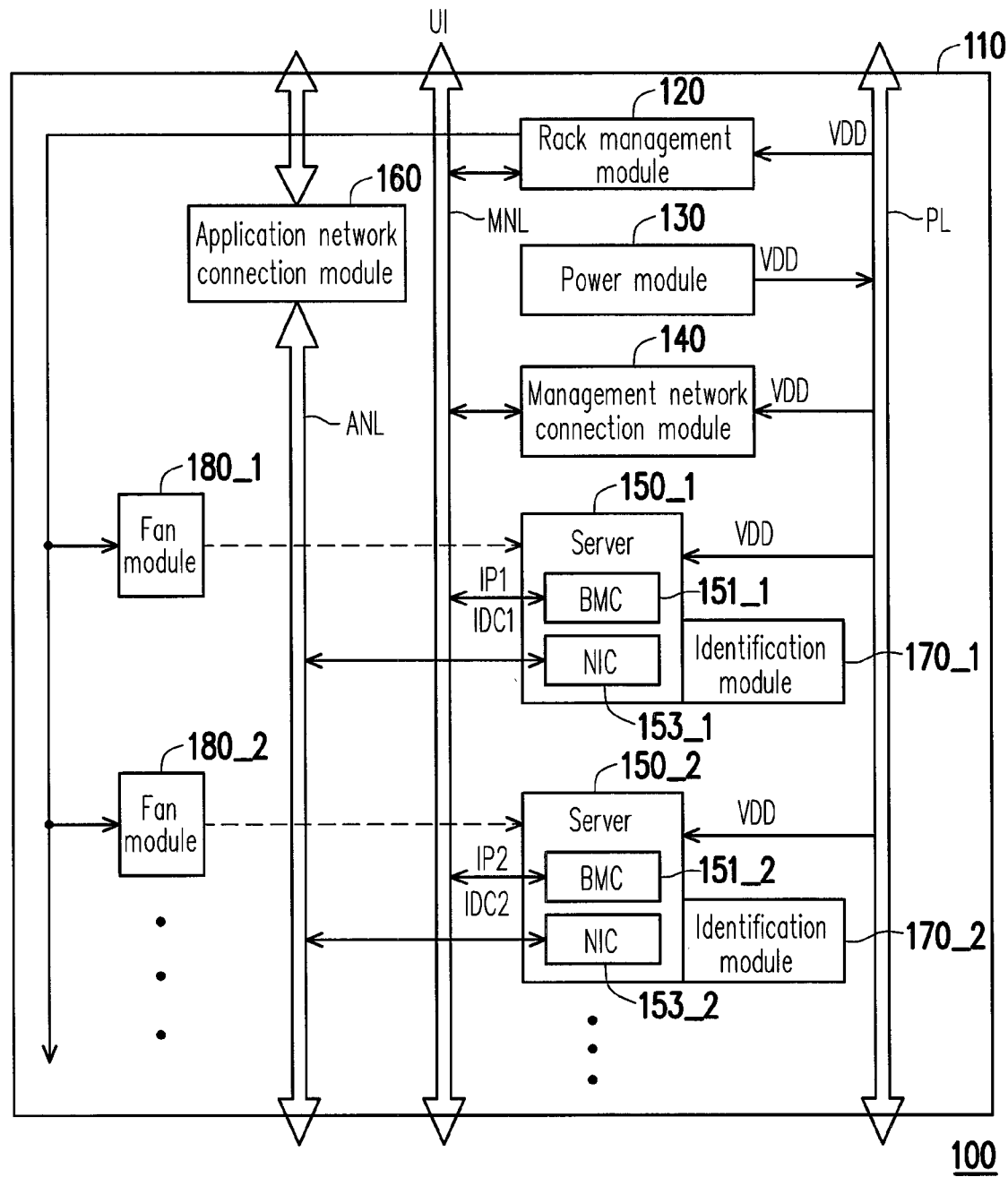

SERVER RACK SYSTEM

CROSS-REFERENCE TO RELATED APPLICATION

This application claims the priority benefit of China application serial no. 201110384132.5, filed on Nov. 28, 2011. The entirety of the above-mentioned patent application is hereby incorporated by reference herein and made a part of this specification.

BACKGROUND OF THE INVENTION

1. Field of the Invention

The present invention generally relates to a server system, and in particular, to a server rack system.

2. Description of Related Art

In recent years, a computer server gradually develops from a conventional single server to a rack server, where several servers are placed in a rack. Since a large number of servers in the rack server exist, management and control for the servers become the critical technology for the rack server. However, in the existing rack server, due to lack of a solution for efficiently managing and controlling the servers, the development of the rack server is seriously hindered.

SUMMARY OF THE INVENTION

Accordingly, the present invention is directed to a server rack system, where a rack management module assigns an Internet Protocol (IP) address corresponding to a baseboard management controller (BMC) of each server and connects to the corresponding BMC through the IP address to control the server.

A server rack system is provided, which includes a rack, a rack management module, a plurality of servers, and a management network connection module. The rack management module is located in the rack and coupled to a management network line (MNL). The servers are located in the rack. Each server includes a BMC, and each BMC is used to monitor a working status of the server where the BMC is located. The management network connection module is located in the rack and coupled to the MNL to be connected to the rack management module and the BMC through the MNL. The rack management module is used to allocate corresponding IP addresses to the BMCs and manage each server through the BMC corresponding to each IP address.

In an embodiment of the present invention, the rack management module provides a user interface (UI) through the MNL, so as to manage the MNL and the servers through the UI.

In an embodiment of the present invention, the rack management module provides a UI through the MNL, so that a network segment is configured for the rack management module through the UI, and the rack management module allocates the IP address in the network segment to each BMC.

In an embodiment of the present invention, the rack management module assigns the IP address corresponding to each BMC according to the Dynamic Host Configuration Protocol (DHCP).

In an embodiment of the present invention, the IP addresses corresponding to the BMCs are different.

In an embodiment of the present invention, the server rack system further includes an application network connection module. The application network connection module is located in the rack, coupled to an application network line (ANL), and coupled to network interfaces of the servers through the ANL, where the servers provide application services through the ANL.

In an embodiment of the present invention, the server rack system further includes at least one identification module. The identification module is located in the rack and corresponds to each server. When each server is inserted in the rack and a corresponding relation is generated between each server and the corresponding identification module, the server generates an identification code signal. The BMC of the server acquires the identification code signal, and sends the identification code signal to the rack management module through the MNL. A record of a corresponding relation between a physical position in the rack and the identification code signal is pre-stored in the rack management module, and after receiving the identification code signal, the rack management module identifies the physical position of the server in the rack according to the record of the corresponding relation.

In an embodiment of the present invention, the server rack system further includes a plurality of fan modules. Each fan modules corresponds to at least one of the servers. The rack management module acquires a corresponding relation between each server and each fan module according to the physical position of each server in the rack, acquires working status information of each server from each BMC through the MNL, and controls operation of the fan module corresponding to each server according to the corresponding relation between each server and each fan module and the working status information of each server.

In an embodiment of the present invention, the server rack system further includes a power module, electrically connected to the rack management module, the management network connection module, and the servers, and used to provide a working voltage required by the rack management module, the management network connection module, and the servers.

In an embodiment of the present invention, the power module is controlled by the rack management module. The rack management module acquires total power consumption information of the server rack system through the power module, and acquires power consumption information of each server from each BMC through the MNL. The rack management module manages each server through each BMC according to the total power consumption information and the power consumption information of each server.

In an embodiment of the present invention, the rack management module is an Intelligent Platform Management Interface (IPMI).

Based on the above, in the server rack system of the embodiment of the present invention, the rack management module automatically allocates the IP address corresponding to each BMC. Therefore, the burden for the user may be reduced, flexibility of using the server may be increased, and it is more conveniently to monitor the working status of the server.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram of a server rack system according to an embodiment of the present invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram of a server rack system according to an embodiment of the present invention. Referring to FIG. 1, in this embodiment, the server rack system 100 includes a rack 110, a rack management module 120, a power module 130, a management network connection module 140, a plurality of servers (ex. 150_1, 150_2), an application network connection module 160, a plurality of identification modules (ex. 170_1, 170_2), and a plurality of fan modules (ex. 180_1, 180_2), where the rack management module 120 is, for example, an IPMI.

In this embodiment, the rack management module 120 is located in the rack 110 and coupled to an MNL. The server (ex. 150_1, 150_2) is located in the rack 110, and each server (ex. 150_1, 150_2) includes a BMC (ex. 150_1, 150_2) and a network interface controller (NIC) (ex. 153_1, 153_2). Each BMC (ex. 151_1, 151_2) is used to monitor a working status of the server (ex. 150_1, 150_2) where the BMC is located, that is, the BMC 151_1 is used to monitor the working status of the server 150_1, and the BMC 151_2 is used to monitor the working status of the server 150_2, and so on.

The management network connection module 140 is located in the rack 110, coupled to the MNL, and used to monitor a message on the MNL. Moreover, the management network connection module 140 is connected to the rack management module 120 and the BMC (ex. 151_1, 151_2) on each server (ex. 150_1, 150_2) through the MNL, that is, transfers a message of the rack management module 120 to the BMC (151_1, 151_2), and transfers a message of the BMC (ex. 151_1, 151_2) to the rack management module 120.

After being connected to the BMC (ex. 151_1, 151_2) through the MNL, the rack management module 120 allocates an IP address (ex. IP1, IP2) corresponding to each BMC (ex. 151_1, 151_2) according to a network segment set inside the rack management module 120, and manages each server (ex. 150_1, 150_2) through the BMC (ex. 151_1, 151_2) corresponding to each IP address. For example, the rack management module 120 allocates the IP address IP1 corresponding to the BMC 151_1, and the rack management module 120 may be connected to the BMC 151_1 through the IP address IP1 to manage the server 150_1. The rack management module 120 allocates the IP address IP2 corresponding to the BMC 151_2, and the rack management module 120 may be connected to the BMC 151_2 through the IP address IP2 to manage the server 150_2.

Moreover, the rack management module 120 provides a UI for a local controller (not shown) or a remote controller (not shown) through the MNL, and the local controller (not shown) or the remote controller (not shown) may manage the MNL and the servers (ex. 150_1, 150_2) in the rack 110 through the UI. Furthermore, the local controller (not shown) or the remote controller (not shown) may configure the network segment corresponding to the rack management module 120 through the UI, and the rack management module 120 allocates the IP address (ex. IP1, IP2) in the network segment to each BMC (ex. 151_1, 151_2). The IP addresses corresponding to the BMCs (ex. 151_1, 151_2) are different from each other (that is, IP1 is different from IP2), and the rack management module 120 may assign the IP address (ex. IP1, IP2) corresponding to each BMC (ex. 151_1, 151_2) through the Dynamic Host Configuration Protocol (DHCP), but other embodiments of the present invention are not limited thereto.

The application network connection module 160 is located in the rack 110, coupled to an ANL, and coupled to the NICs (ex. 153_1, 153_2) of the servers (ex. 150_1, 150_2) through the ANL, that is, coupled to network interfaces of the servers (ex. 150_1, 150_2). The servers (ex. 150_1, 150_2) provide application services through the ANL.

The identification modules (ex. 170_1, 170_2) are located in the rack and correspond to the servers (ex. 150_1, 150_2). For example, the identification module 170_1 corresponds to the server 150_1, and the identification module 170_2 corresponds to the server 150_2. The number of identification modules corresponds to the number of servers capable of being inserted in the rack 110, that is, when the number of the server capable of being inserted in the rack 110 is 1, the number of identification module is 1, and when the number of the servers capable of being inserted in the rack 110 is 2, the number of identification modules is 2.

When each server (ex. 150_1, 150_2) is inserted in the rack 110 and a corresponding relation (for example, electrical connection or contact) is generated between each server (ex. 150_1, 150_2) and the corresponding identification module (ex. 170_1, 170_2), the server (ex. 150_1, 150_2) generates an identification code signal (ex. IDC1, IDC2). For example, when the server 150_1 is inserted in the rack 110 and electrically connects to or contacts the identification module 170_1, the server 150_1 generates the identification code signal IDC1; when the server 150_2 is inserted in the rack 110 and electrically connects to or contacts the identification module 170_2, the server 150_2 generates the identification code signal IDC2.

When acquiring the identification code signals (ex. IDC1, IDC2), the BMC (ex. 151_1, 151_2) of the server (ex. 150_1, 150_2) sends the identification code signal (ex. IDC1, IDC2) to the rack management module 120 through the MNL. Records of corresponding relations between a plurality of physical positions in the rack 110 and the identification code signals (ex. IDC1, IDC2) are pre-stored in the rack management module 120. Therefore, after receiving the identification code signal (ex. IDC1, IDC2), the rack management module 120 identifies the physical position of the server (ex. 150_1, 150_2) in the rack 110 according to the record of the corresponding relation. For example, the rack management module 120 identifies the physical position of the server 150_1 in the rack 110 according to the identification code signal IDC1, and identifies the physical position of the server 150_2 in the rack 110 according to the identification code signal IDC2.

In this embodiment, each fan module (ex. 180_1, 180_2) corresponds to one of the servers (ex. 150_1, 150_2) according to configuration of a physical position of the fan module (ex. 180_1, 180_2). For example, the physical position of the fan module 180_1 corresponds to the physical position of the server 150_1, and the physical position of the fan module 180_2 corresponds to the physical position of the server 150_2. Based on the above, the fan module 180_1 is used to decrease a working temperature of the server 150_1, and the fan module 180_2 is used to decrease a working temperature of the server 150_2. In this embodiment, each fan module (ex. 180_1, 180_2) corresponds to one of the servers (ex. 150_1, 150_2). However, in other embodiments, according to a design of the fan module or a heat-removal system, each fan module may correspond to two or more servers, which can be changed by persons of ordinary skill in the art.

Based on the above, the rack management module 120 acquires a corresponding relation between each server (ex. 150_1, 150_2) and each fan module (ex. 180_1, 180_2) according to the physical position of each server (ex. 150_1, 150_2) in the rack 110. Moreover, the rack management module 120 may acquire working status information of each server (ex. 150_1, 150_2) from each BMC (ex. 151_1, 151_2) through the MNL, and control operation of the fan module (ex. 180_1, 180_2) corresponding to each server (ex. 150_1, 150_2) according to the corresponding relation between each server (ex. 150_1, 150_2) and each fan module (ex. 180_1, 180_2) and the working status information of each server (ex. 150_1, 150_2). For example, when the working status information of the server 150_1 indicates that a workload of the server 150_1 becomes heavy, an air speed of the fan module 180_1 is increased correspondingly; when the working status information of the server 150_1 indicates that a workload of the server 150_1 becomes light, the air speed of the fan module 180_1 is reduced correspondingly; when the working status information of the server 150_1 indicates that the server 150_1 is in a sleep state, an air speed of the fan module 180_1 is correspondingly adjusted to be maintained in a low speed operation.

The power module 130 is electrically connected to the rack management module 120, the management network connection module 140, and each server (ex. 150_1, 150_2) through a power line (PL) and used to provide a working voltage VDD required by the rack management module 120, the management network connection module 140, and the servers (ex. 150_1, 150_2). In this embodiment, the power module 130 is controlled by the rack management module 120, and the rack management module 120 acquires total power consumption information of the server rack system 100 through the power module 130 and acquires power consumption information of each server (ex. 150_1, 150_2) from each BMC (ex. 151_1, 151_2) through the MNL. The rack management module 120 may be connected to the power module 130 through the MNL or the PL, but the embodiment of the present invention is not limited thereto.

The rack management module 120 manages each server (150_1, 150_2) through each BMC (ex. 151_1, 151_2) according to the total power consumption information and the power consumption information of each server (ex. 150_1, 150_2). For example, when the total power consumption information exceeds an upper limit of rack power consumption, the working speed of each server (ex. 150_1, 150_2) is reduced, so as to reduce the power consumption information of each server (ex. 150_1, 150_2); when the power consumption information of each server (ex. 150_1, 150_2) exceeds an upper limit of server power consumption, the working speed of each server (ex. 150_1, 150_2) is reduced correspondingly. The upper limit of rack power consumption and the upper limit of server power consumption may be set by persons of ordinary skill in the art, and the embodiment of the present invention is not limited thereto.

In sum, in the server rack system of the embodiment of the present invention, the rack management module allocates the IP address corresponding to each BMC according to the set network segment. Therefore, the burden for the user may be reduced, flexibility of using the server may be increased, and it is more conveniently to monitor the working status of the server. The rack management module can know which servers are inserted and the number of the inserted servers according to the allocated IP addresses. Furthermore, when the corresponding relation is generated between the server and the identification module, the server generates the identification code signal corresponding to the physical position of the server, so that the server rack system knows the corresponding relation between the fan module and the server according to the identification code signal, and correctly controls the operation of the fan module according to the working status of the server. Moreover, the rack management module dynamically acquires the total power consumption information and the power consumption information of each server, and dynamically monitors and manages the working status of each server according to the total power consumption information and the power consumption information of each server.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server rack system, comprising:
    a rack;
    a rack management module, located in the rack and coupled to a management network line (MNL);
    a plurality of servers, located in the rack, wherein each server comprises a baseboard management controller (BMC), and each BMC is used to monitor a working status of the server where the BMC is located; and
    a management network connection module, located in the rack and coupled to the MNL to be connected to the rack management module and the BMC;
    an application network connection module, located in the rack, coupled to an application network line (ANL), and coupled to network interfaces of the servers through the ANL, wherein the servers provide application services through the ANL,
    wherein the rack management module is used to allocate an Internet Protocol (IP) address to the BMC and manage each server through the BMC corresponding to each IP address.

2. The server rack system according to claim 1, wherein the rack management module provides a user interface (UI) through the MNL, so as to manage the MNL and the servers through the UI.

3. The server rack system according to claim 1, wherein the rack management module provides a UI through the MNL, so that a network segment is configured for the rack management module through the UI, and the rack management module allocates the IP address in the network segment to each BMC.

4. The server rack system according to claim 3, wherein the rack management module assigns the IP address corresponding to each BMC according to the Dynamic Host Configuration Protocol (DHCP).

5. The server rack system according to claim 3, wherein the IP addresses corresponding to the BMCs are different from each other.

6. The server rack system according to claim 1, further comprising:
    at least one identification module, located in the rack and corresponding to each server,
    wherein when each server is inserted in the rack and a corresponding relation is generated between each server and the corresponding identification module, the server generates an identification code signal; the BMC of the server acquires the identification code signal, and sends the identification code signal to the rack management module through the MNL; a record of a corresponding relation between a physical position in the rack and the identification code signal is pre-stored in the rack management module, and after receiving the identification code signal, the rack management module identifies the physical position of the server in the rack according to the record of the corresponding relation.

7. The server rack system according to claim 6, further comprising:

a plurality of fan modules, each corresponding to at least one of the servers, wherein the rack management module acquires a corresponding relation between each server and each fan module according to the physical position of each server in the rack, acquires working status information of each server from each BMC through the MNL, and controls operation of the fan module corresponding to each server according to the corresponding relation between each server and each fan module and the working status information of each server.

8. The server rack system according to claim 1 further comprising:

a power module, electrically connected to the rack management module, the management network connection module, and the servers, and used to provide a working voltage required by the rack management module, the management network connection module, and the servers.

9. The server rack system according to claim 8, wherein the power module is controlled by the rack management module;

the rack management module acquires total power consumption information of the server rack system through the power module, and acquires power consumption information of each server from each BMC through the MNL; and the rack management module manages each server through each BMC according to the total power consumption information and the power consumption information of each server.

10. The server rack system according to claim 1, wherein the rack management module is an Intelligent Platform Management Interface (IPMI).

\* \* \* \* \*